United States Patent [19]

Walker

[11] Patent Number: 4,516,653

[45] Date of Patent: May 14, 1985

[54] VEHICLE MOUNTED PARKING DEVICE FOR USE ON FRONT WHEEL DRIVE VEHICLES

[76] Inventor: Brooks Walker, 1280 Columbus Ave., San Francisco, Calif. 94133

[21] Appl. No.: 594,691

[22] Filed: Mar. 29, 1984

Related U.S. Application Data

[63] Continuation-in-part of Ser. No. 394,529, Jun. 2, 1982, abandoned.

[51] Int. Cl.³ .............................................. B60K 7/00
[52] U.S. Cl. ..................................... 180/199; 254/423
[58] Field of Search ............... 180/199, 200, 201, 202; 280/761; 104/50; 105/177; 254/894, 423

[56] References Cited

U.S. PATENT DOCUMENTS

| Re. 18,904 | 7/1933 | Walker | 180/200 |
|---|---|---|---|
| Re. 20,707 | 4/1938 | Walker | 180/200 |
| 1,693,288 | 11/1928 | Walker | 180/200 |
| 1,742,566 | 1/1930 | Walker | 180/200 |
| 1,884,932 | 10/1932 | Walker | 180/200 |
| 1,884,933 | 10/1932 | Walker | 180/200 |
| 1,990,150 | 2/1935 | Walker | 180/201 |
| 2,002,724 | 5/1935 | Walker | 180/199 |
| 2,005,173 | 6/1935 | Walker | 180/200 |
| 2,054,842 | 9/1936 | Walker | 180/200 |
| 2,136,570 | 11/1938 | Walker | 180/200 |
| 2,139,341 | 12/1938 | Walker | 180/201 |
| 2,358,592 | 9/1944 | Quinn | 180/199 |
| 3,011,574 | 12/1961 | Walker et al. | 180/200 X |
| 3,011,575 | 12/1961 | Bouet | 180/200 |
| 3,061,028 | 10/1962 | Walker | 180/200 |
| 3,084,756 | 4/1963 | Walker | 180/200 |
| 3,086,605 | 4/1963 | Walker | 180/201 |
| 3,095,936 | 7/1963 | Walker | 180/201 |
| 3,216,703 | 11/1965 | Walker | 180/200 X |
| 3,589,462 | 6/1971 | Inagaki | 180/202 |

OTHER PUBLICATIONS

Brochure of "Rear Tire Walker Parccar" by Brooks Walker, dated Jun. 23, 1932.
Photograph of "Walker Parccar" dated Jun. 25, 1932.
Brochure of "The Fifth Wheel" by Brooks Walker for Walker Parccar.
Letter to Commissioner of Patents from Brooks Walker including pamphlet of "Walker Parccar".
Photograph in "Herald" Newspaper (UP Photo) dated Nov. 29, 1952 of Car and Number 2,136,570 indicated thereon.

Primary Examiner—Joseph F. Peters, Jr.
Assistant Examiner—Mitchell J. Hill
Attorney, Agent, or Firm—Flehr, Hohbach, Test, Albritton & Herbert

[57] ABSTRACT

A vehicle mounted parking device for use on a front wheel drive vehicle of the type having motive means and at least two front and two rear wheels. An auxiliary wheel is mounted substantially between and equidistant from the rear wheels and is mounted so as to permit movement relative to the vehicle frame between an out-of-the-way position and a lower operative ground engaging and rear end of the vehicle lifting position such that the rear wheels are raised off the ground. Power means is provided so that the auxiliary wheel may be forced under the rear of the car to raise the rear wheels and to place the rear end weight of the vehicle on the auxiliary wheel. The auxiliary wheel, when in operative position, allows lateral movement of the rear end of the vehicle with a minimum of longitudinal vehicle movement. The auxiliary wheel may be mounted so that its axis of rotation forms an angle between approximately 20° and 60° with the longitudinal center line of the vehicle so that the axis of rotation passes between the front and rear wheel on one side of said vehicle. The rotation of both front wheels by the motive means will cause the lateral movement of the rear portion of the vehicle said auxiliary wheel when said auxiliary wheel is in the ground engaging and rear end of the vehicle lifting position.

20 Claims, 16 Drawing Figures

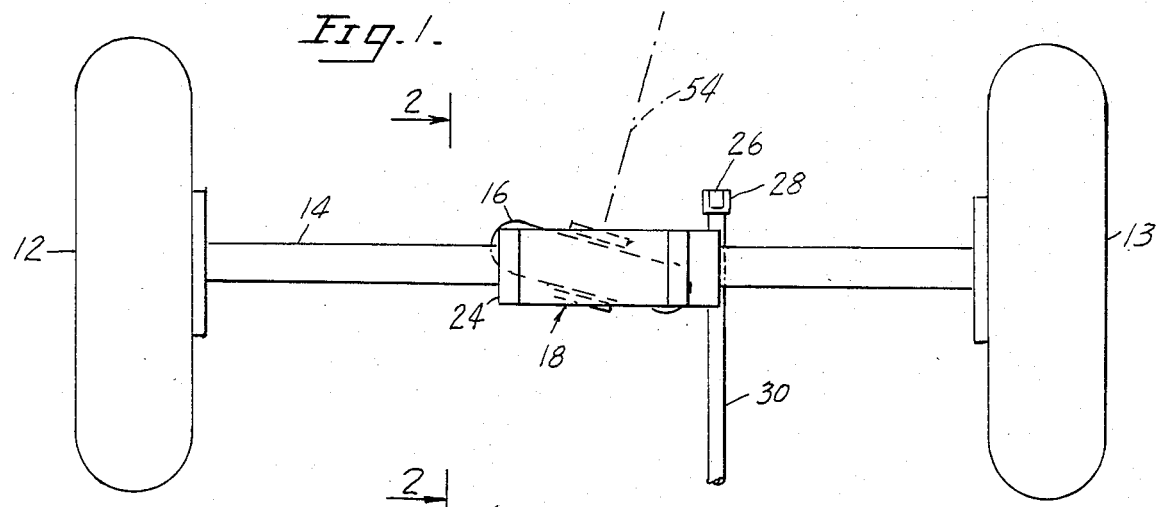
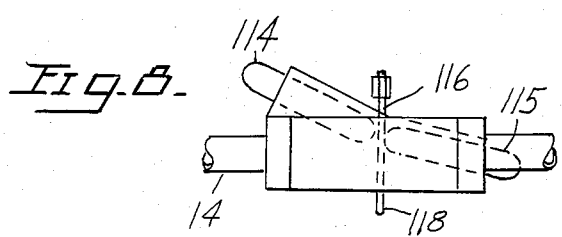
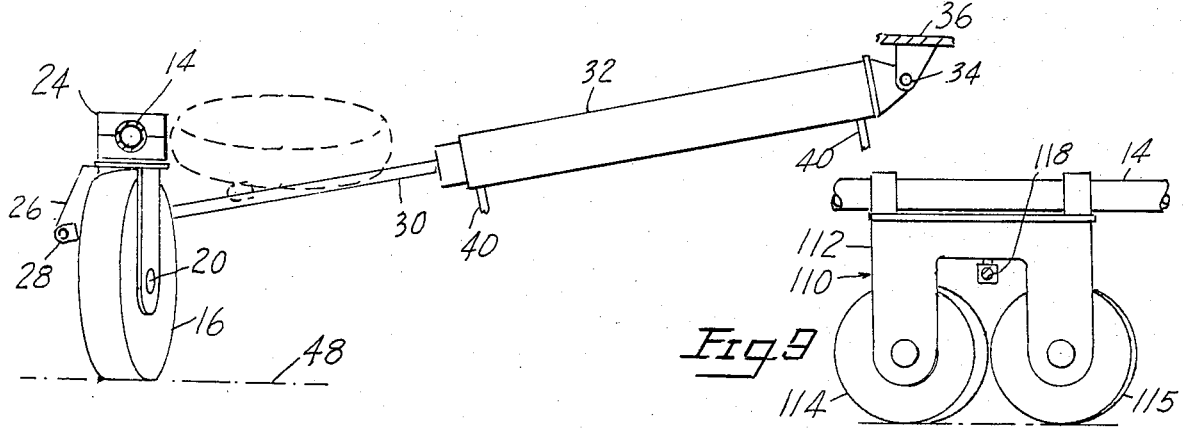
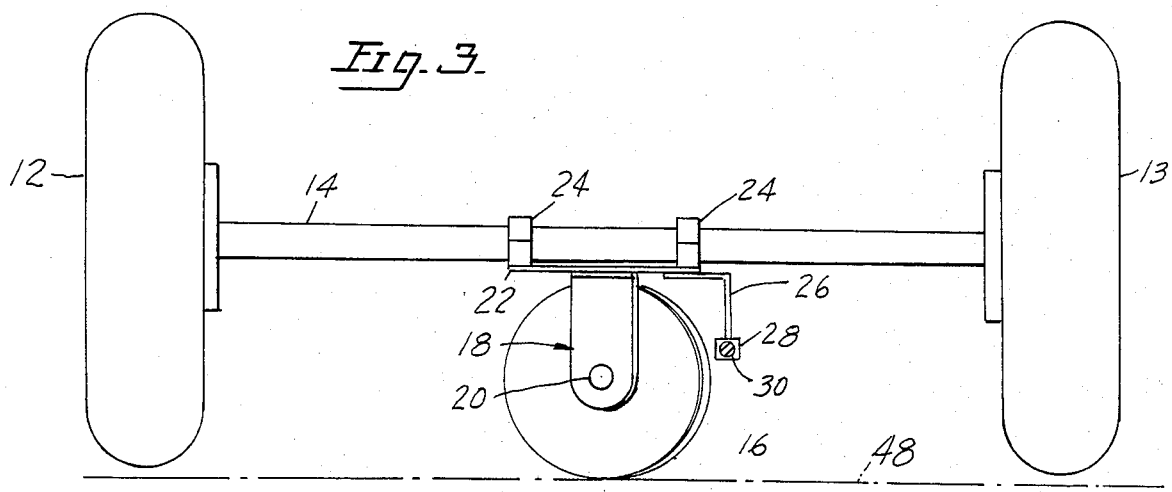

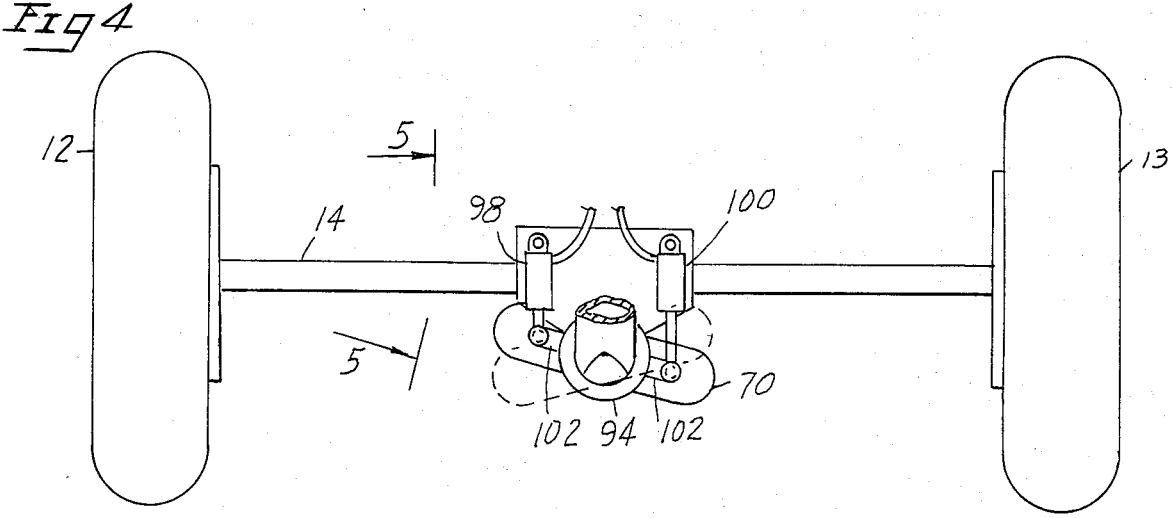
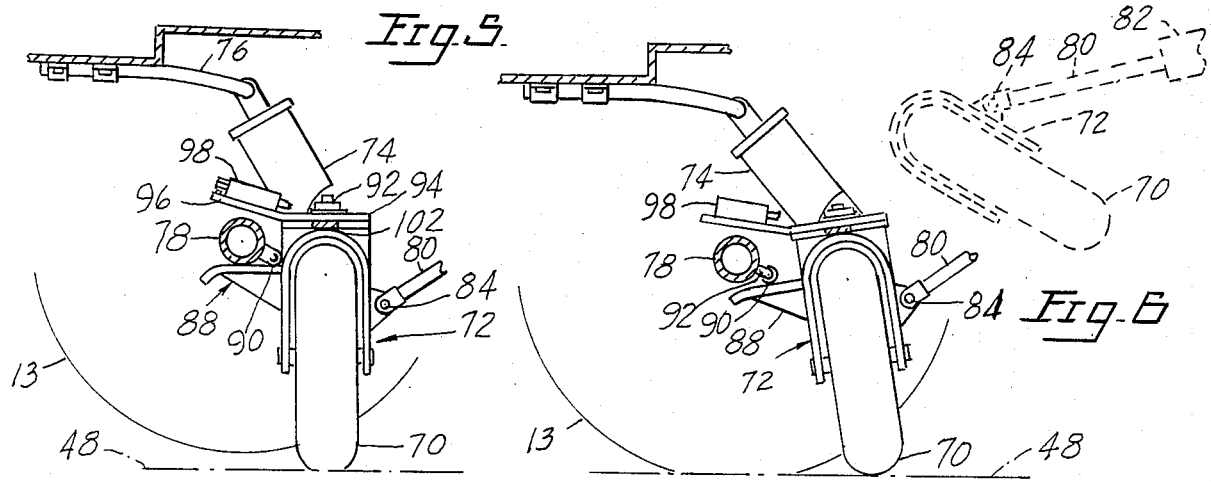
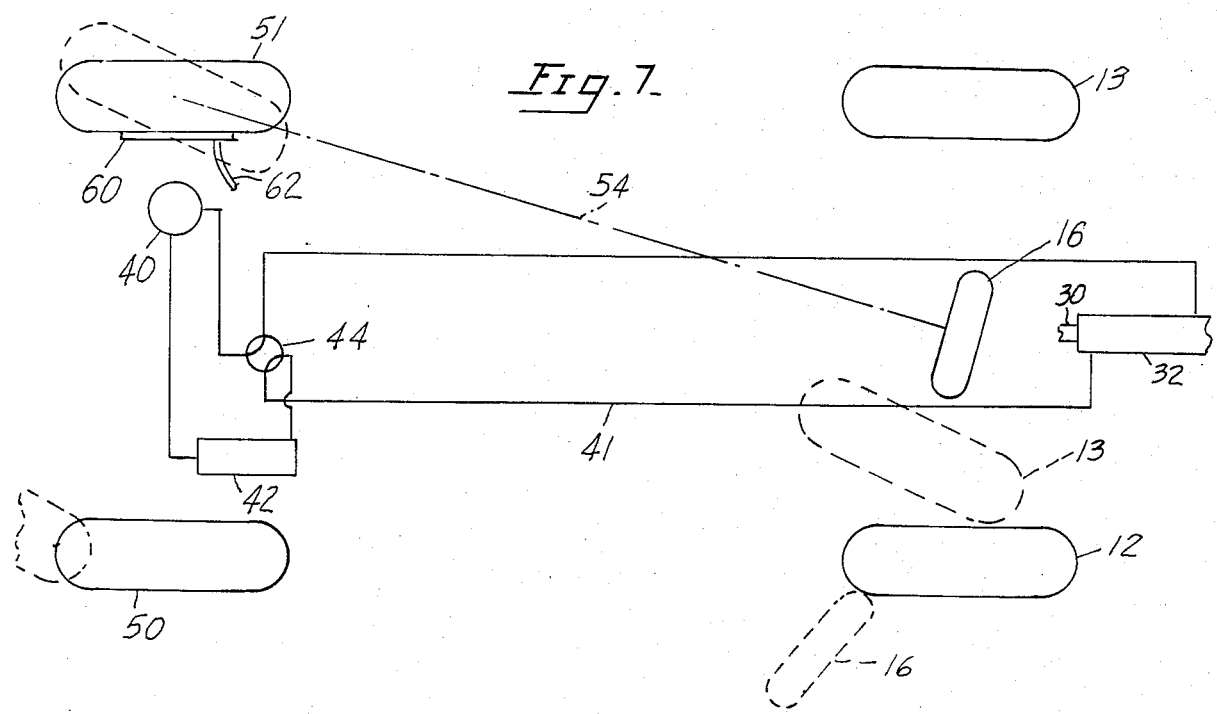

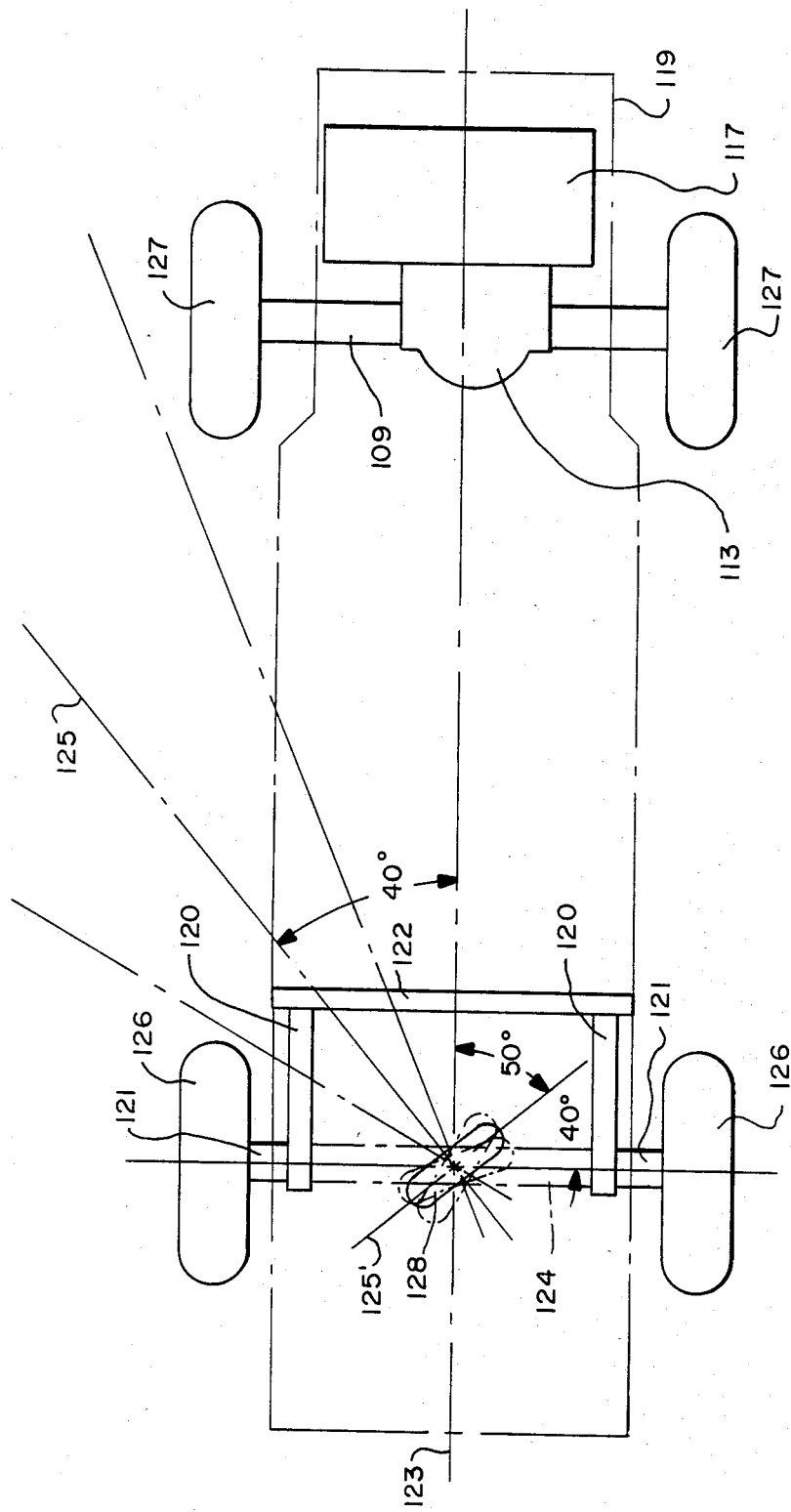
FIG.—10

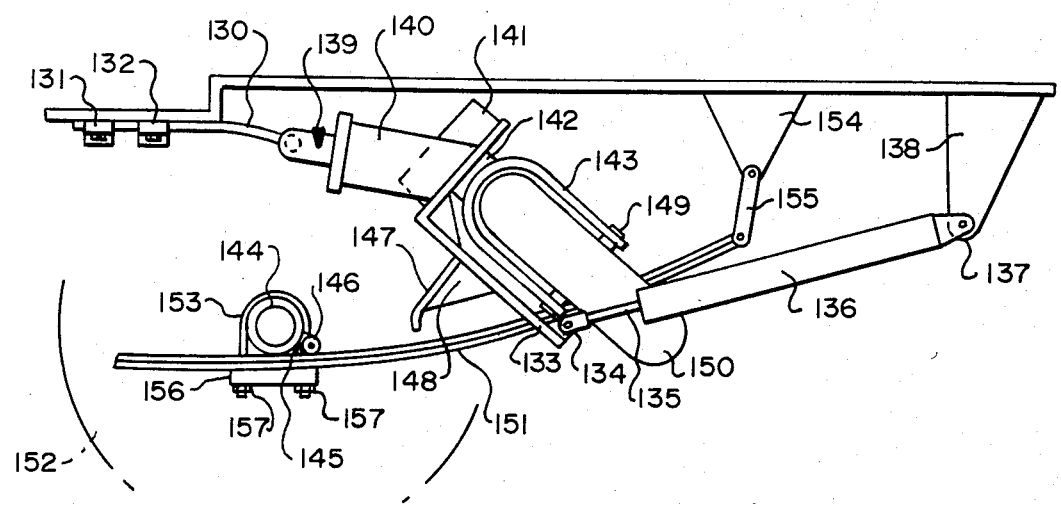
FIG.—11
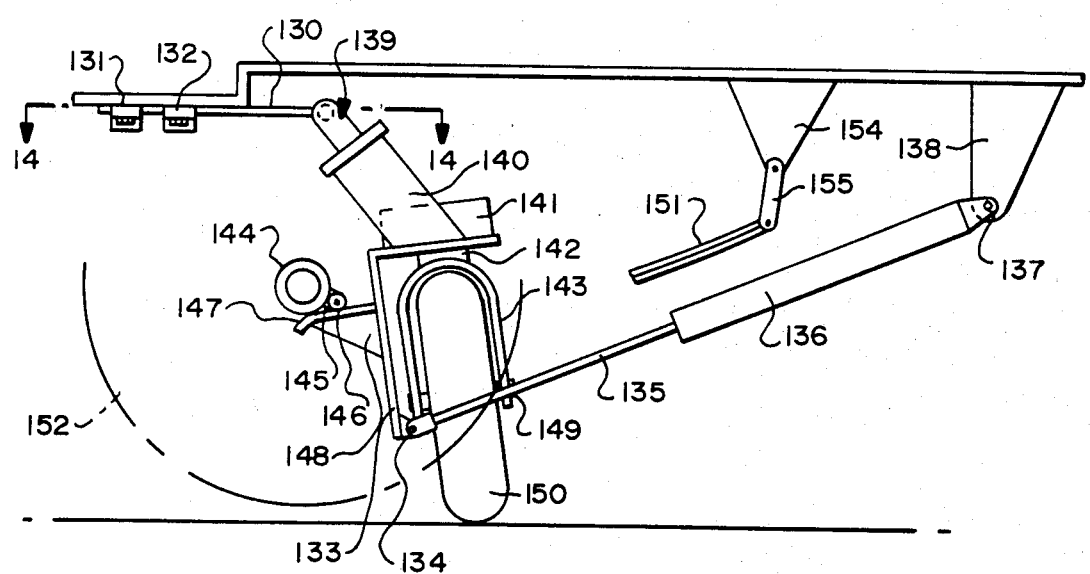
FIG.—12

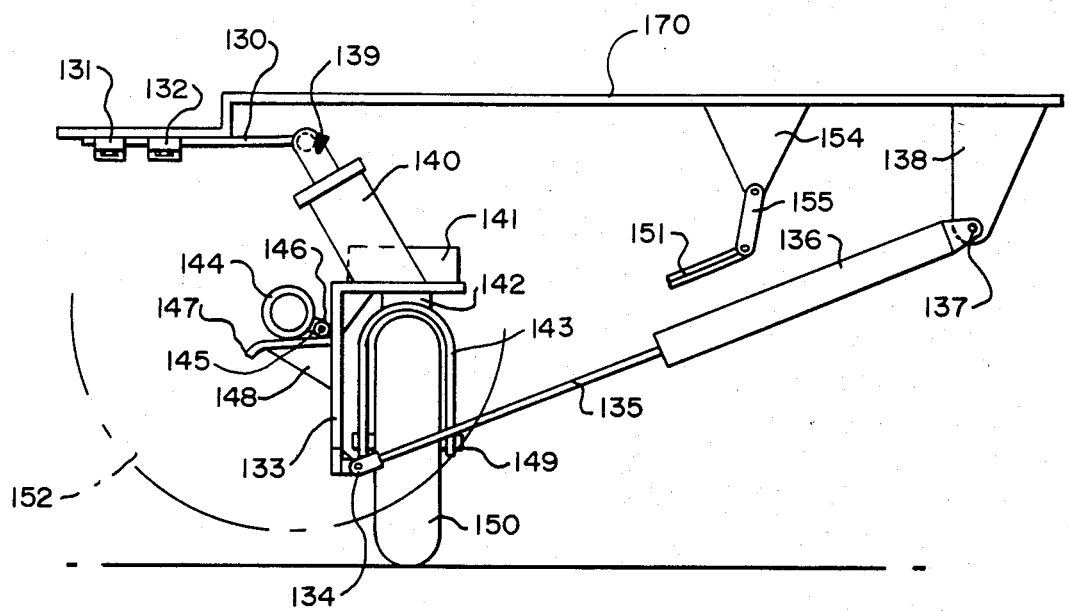
FIG.—13
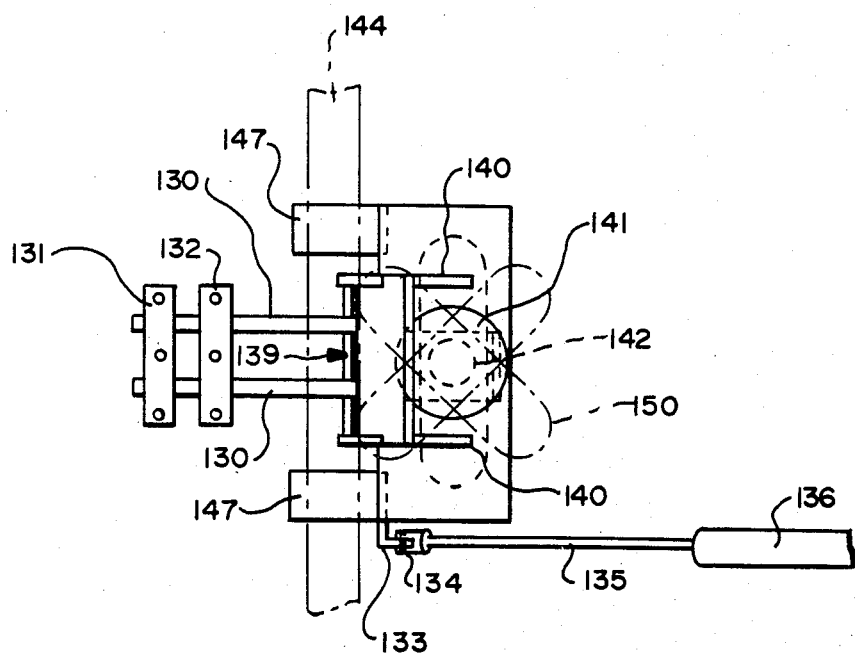
FIG.—14

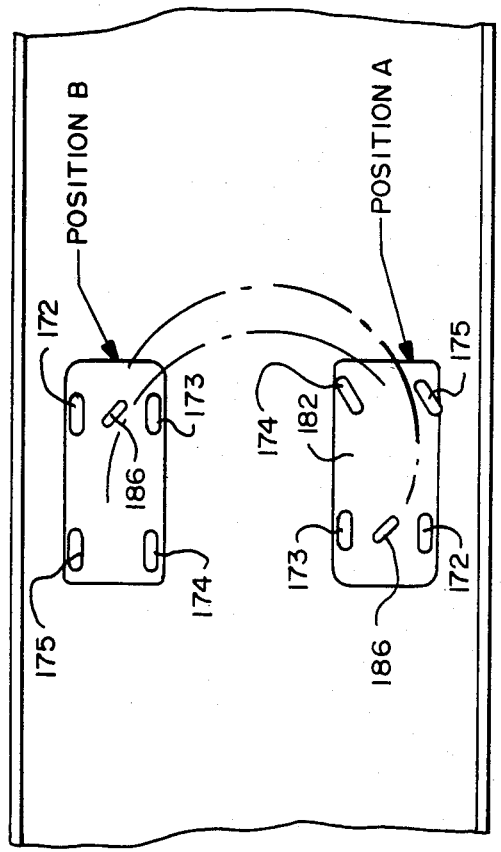
FIG.—16
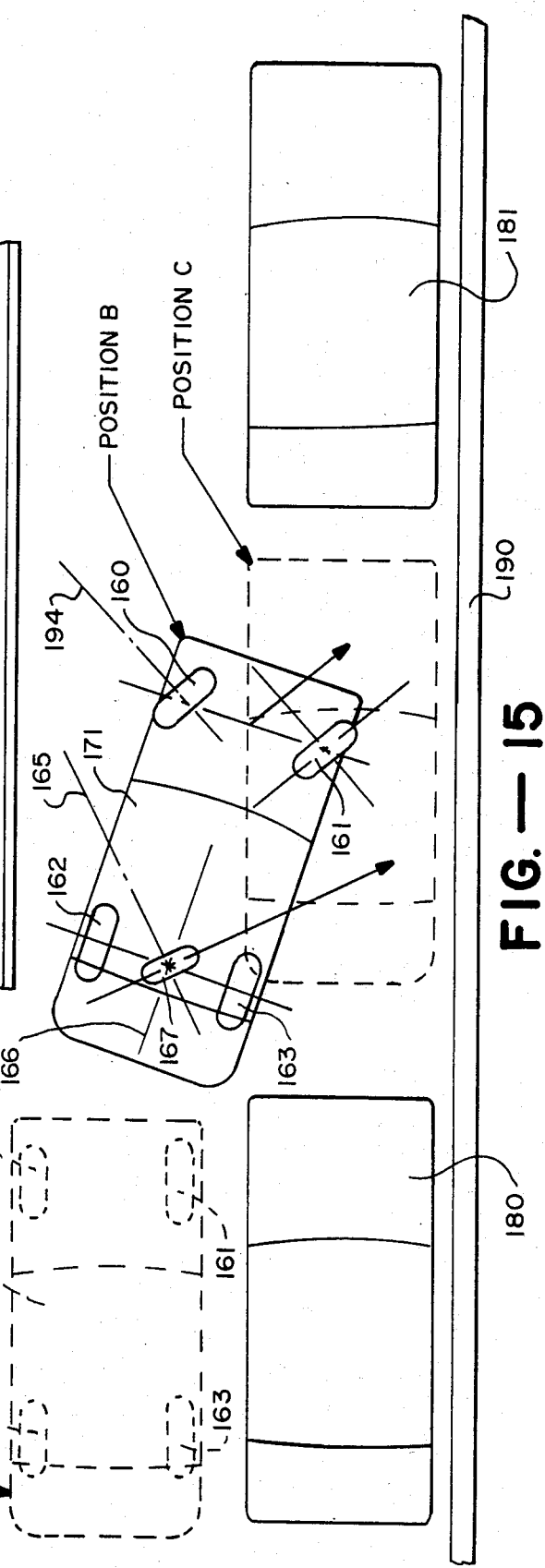
FIG.—15

VEHICLE MOUNTED PARKING DEVICE FOR USE ON FRONT WHEEL DRIVE VEHICLES

This application is a continuation-in-part of application Ser. No. 394,529, filed July 2, 1982, now abandoned.

This invention relates to a vehicle mounted parking devices for use on front wheel drive vehicles for permitting sideward movement, rotary movement, parking movement and sidewise movement of the vehicle in limited space.

The present invention is directed to a vehicle mounted parking device for use on front wheel drive vehicles to facilitate parking a vehicle in a manner similar to that disclosed in U.S. Pat. Nos. 1,742,566; 1,844,932; 1,844,933; 1,990,150; 2,002,724; 2,358,592; and 3,084,758. This invention is specifically directed to a parking device mounted on the rear portion of a front wheel drive vehicles having at least four vehicle supporting wheels.

Some of the prior art devices have required use of special braking systems, the use of special means to drive the auxiliary wheel, itself, or both, Some of these devices have also suffered from their inability to be useful when engaging the auxiliary wheel on a warped surface or when engaging the auxiliary wheel when the vehicle has a flat tire, because the engagement means of these devices which lift and hook the axle and then support the vehicle were hampered or prevented. Moreover, even if operable in such conditions, the prior devices did not always provide adequate means for cushioning the passengers or load carried by the vehicle when these devices were engaged and operated on a rough surface. The teachings of the present invention overcome these and other problems and limitations associated with the devices of the prior art. The present invention in one or more of its forms allows free use of the vehicle's suspension system, requires no special braking system, requires no special provisions to directly power the auxiliary wheel, engages the axle means substantially midway between the rear wheels, and allows engagement of the device for facilitating parking a front wheel drive vehicle without substantial loss of control by the operator over the vehicle.

In general it is an object of the present invention to provide a vehicle mounted parking device for use on a front wheel drive vehicle to facilitate parking for such a vehicle equipped with at least four vehicle supporting wheels.

Another object of the invention is to provide a vehicle of the same character as described above with a relatively simple vehicle mounted device for facilitating parking which operates by the motion imparted by the front driving wheels of the vehicle to give lateral movement to at least the rear end of the vehicle in an improved manner.

Another object of the invention is to provide a vehicle of the same character as described above with a relatively simple vehicle mounted parking device which operates by the motion imparted by the front driving wheels of the vehicle to give lateral movement to the rear portion of the vehicle the rear portion of the vehicle moves a greater distance to the side for a given distance of forward travel than the front portion of the vehicle, even when the front wheels are inclined to their maximum angle toward the same side of the vehicle as the auxiliary wheel.

Another object of the invention is to provide a vehicle of the same character as described above with a vehicle mounted parking device which requires minimum modification of a front wheel drive vehicle to permit installation of the device as retrofit equipment.

Another object of the invention is to provide a vehicle of the same character as described above with a vehicle mounted parking device which will require minimum modification of a front wheel vehicle to permit the manufacture of the vehicle with the device attached.

Another object of the invention is to provide a vehicle of the same character as described above with a vehicle mounted parking device which operates with minimum modifications of a front wheel drive vehicle to permit use of the vehicle's yieldable support for the rear portion of the vehicle when the parking device is in the out-of-the-way position and the ground engaging and rear end of the vehicle lifting position.

Another object of the invention is to provide a vehicle of the same character as described above with a vehicle mounted parking device which when in the out-of-the-way position is in a substantially horizontal position relative to the ground to that the device may be installed and used without major modifications of a vehicle.

Another object of the invention is to provide a vehicle of the same character as described above with a vehicle mounted parking device which promotes ease of parking and ease of exiting a parking space.

Another object of the invention is to provide a vehicle of the same character as described above with a vehicle mounted parking device which permits a reduced turning radius of the vehicle to which it is attached.

Another object of the invention is to provide a vehicle of the same character as described above with a vehicle mounted parking device which will operate and be functional in uneven terrain.

Another object of the invention is to provide a vehicle of the same character as described above with a vehicle mounted device which will operate and be functional when the vehicle has a flat rear tire, as will allow lifting the rear portion of the vehicle for changing said flat tire.

Still another object of the invention is to provide a vehicle of the same character as described above with a vehicle mounted parking device which is part of the sprung weight when in the out-of-the-way position and which lifts and supports the rear portion of vehicle in part through the rear yieldable means of the vehicle when in the ground engaging and rear end of the vehicle lifting position.

Other objects and advantages of the invention will be apparent from the following specification and drawings:

FIG. 1 is a top plan view of the rear end of a front drive vehicle incorporating the vehicle mounted parking device of the present invention and showing the device in operative or ground engaging and rear end of the vehicle lifting position.

FIG. 2 is a cross sectional view taken along the line 2—2 of FIG. 1.

FIG. 3 is a rear elevational view of the vehicle shown in FIG. 1.

FIG. 4 is a view similar to FIG. 1 showing another embodiment of the present invention.

FIG. 5 is a cross-section view taken along the line 5—5 of FIG. 4 showing the auxiliary wheel in a ground engaging and rear end of the vehicle lifting position.

FIG. 6 is a view similar to FIG. 5 showing the auxiliary wheel in the ground engaging position where it has engaged the axle.

FIG. 7 is a schematic plan view of a portion of the undercarriage of the vehicle and particularly showing the hydraulic system for operating the auxiliary wheel of the present invention.

FIG. 8 is a fragmentary view similar to FIG. 1 showing another embodiment of the invention.

FIG. 9 is a fragmentary view similar to FIG. 3 showing a modified form of FIG. 8 in detail.

FIG. 10 is a schematic plan view of an embodiment of the invention showing various orientations of the auxiliary wheel in a vehicle.

FIG. 11 is a cross-sectional view of another embodiment of the invention showing the auxiliary in the out-of-the-way or raised position.

FIG. 12 is a view similar to FIG. 11 showing the auxiliary wheel in a ground engaging position as it has partially lifted the rear axle and the vehicle.

FIG. 13 is a view similar to FIGS. 12 and 11 showing the auxiliary wheel in the ground engaging and rear end of the vehicle lifting position, so that the rear wheels are out of engagement with the ground and the rear portion of the vehicle is in its fully lifted orientation.

FIG. 14 is a cross-sectional view taken along the line 14—14 in FIG. 12.

FIG. 15 is a schematic plan view similar to FIG. 10 showing one mode of operation of a vehicle with the present invention.

FIG. 16 is a schematic plan view similar to FIG. 10 showing another mode of operation of a vehicle with the present invention.

In practicing the present invention, a vehicle mounted parking device for use on front wheel drive vehicles is provided which is readily attachable to the frame, axle, floor of the vehicle, or other convenient location and to which power means are connected to cause the device to be moved from an out-of-the-way position to an operative ground engaging and rear end of the vehicle lifting position so that the vehicle is lifted through its yieldable means for yieldably supporting the rear end of the vehicle and the rear wheels of the vehicle no longer engage the ground.

After the device is actuated to the ground engaging and rear end of the vehicle lifting position, the vehicle is shifted sidewardly by the actuation of front driving wheels which are controlled by the vehicle's transmission, steering, and brakes. When referring to left and right sides of the vehicle, it should be recognized that these directions are with respect to a person in or on the vehicle and facing the vehicle's front wheels or tires. It should also be understood that reference to frame or frame means include the floor of the vehicle, a unitized body structure, other means for providing structural support to the vehicle.

Various modified forms of the structure employed for mounting the device and for making use of the vehicle's suspension system, as well as several of the modes of operation of the vehicle with a device are illustrated and will now be described in detail.

In detail, and first referring to FIGS. 1-3, the left and right rear ground wheels of the vehicle are indicated at 12,13 and the rear axle at 14. An auxiliary wheel 16 is provided between the rear ground wheels and is supported in a saddle-like mount 18 having an axle 20. Mount 18 includes an elongated top plate 22 to which are secured a pair of bearings 24 which rotably support the mount on the rear axle 14.

Fixed to mount 18 is a bracket 26 to which is pivotally connected a clevis 28 on the outer end of the piston rod 30 of a hydraulic cylinder 32.

The opposite end of cylinder 32 may be pivotally connected by pin 34 to any convenient structure such as floor 36 (FIG. 2) or the body or frame.

As best seen in FIG. 7, the cylinder 32 may be operated by a pump 40 in oil line 41 supplied by a tank 42 and controlled through a three-position valve 44. With the valve 44 in the position indicated in FIG. 7 the cylinder 32 forces the mount 18 and wheel 16 from the upper inoperative position indicated by dotted lines in FIG. 2 to the lower operative position in engagement with the vehicle supporting surface 48.

As best seen in FIG. 3, when the auxiliary wheel 16 is forced to its operative position by cylinder 32 it causes the rear wheels 12,13 to be raised off the vehicle supporting surface 48 as the mount 18 forces the rear axle 14 upwardly. In this connection it will be understood that if the power drive of the vehicle is in neutral with the brakes released the rearward thrust of cylinder 32 on pivot pin 34 may cause the vehicle to backup and roll sidewise slightly until the auxiliary wheel 16 assumes its raised operative position shown in FIG. 5. It should be understood that, if auxiliary wheel 16 is engaged and lifts the vehicle at a substantial angle to the longitudinal center line of the vehicle as in FIG. 10 then the vehicle does not back-up when the rear portion of the vehicle is lifted by the engagement of the auxiliary wheel and the vehicle's transmission is in a park type position.

By making the piston rod 30 a predetermined length, the piston (not shown) in cylinder 32 may be made to engage the outer end of cylinder 32 thus providing a stop when the auxiliary wheel 16 is in its ground engaging and rear end of the vehicle lifting position.

If some air is admitted to the hydraulic system, the connection between the floor 36 on the sprung weight and the mount 18 on the unsprung weight may be made yieldable enough so as not to oppose the action of the vehicle springs when the auxiliary wheel is in its upper out-of-the-way position indicated by dotted lines in FIG. 2.

Referring now to the schematic view of FIG. 7, the left and right front wheels are indicated at 50,51 and it will be seen that mount 18 rotably supports auxiliary wheel 16 with its axis of rotation 54 angularly disposed relative the vertical longitudinal central plane of the vehicle. More particularly, as best seen in FIG. 7, the angularity of said axis is such that it intersects the vertical central axis of the right front wheel 51 in one form of the invention.

The operation of the device will be apparent from FIG. 7. With the vehicle angularly disposed relative to the desired parking area and with the ground wheels and auxiliary wheel in the dotted line positions the front wheel drive vehicle may be placed in reverse to effect lateral movement to the position indicated in full lines.

This result is due to the fact that rearward movement of the right front wheel is resisted by the friction of auxiliary wheel 16 on the supporting surface 48, but rearward movement of the left front wheel 50 is not resisted so that the vehicle, in effect, swings about right front wheel 51 when supported on auxiliary wheel 16, in this form of the invention.

The valve 44 may, of course, be turned to its opposite position to reverse the action of cylinder 32 moving the auxiliary wheel to the out-of-the-way position. Furthermore the valve may be moved to an intermediate position to block the flow of fluid thereby locking the cylinder 32 with the auxiliary wheel in inoperative position.

If desired, a manually operated brake 60 actuated by push-pull cable 62 may be provided on wheel 51 and operated from the driver's seat in the conventional manner so as to insure that wheel 51 remains stationery during the sidewise movement of the rear wheels 12,13. Further, it may be desirable to provide a manually operated brake like brake 61 actuated by a push-pull cable like cable 63 on the auxiliary wheel 16 like that provided on wheel 51 and operable from driver's seat in a conventional manner, so as to have auxiliary wheel 16 remain stationary during the engaging of the auxiliary wheel.

When leaving the parking space the above described operation is the same except that the vehicle is placed in forward gear to swing the rear portion of the vehicle outwardly from the parking space.

It will be apparent that the angularity of auxiliary wheel 16 may be reversed so that its axis of rotation points to the left front wheel. This may be desirable, if the vehicle is used in areas where vehicles are driven on the left side of the road or where one-way streets are prevalent.

In FIGS. 4-6 a modified form of the invention is shown. In this case the auxiliary wheel 70 is rotably supported in a mount generally designed 72 which is connected at its upper end with an angularly disposed arm 74 which in turn is swingably connected to the sprung weight body of the vehicle by a cantilevered U-shaped hanger 76. The pivot of hanger 76 is preferably nearly over the axle 78 of the vehicle and the wheel mount 72 is rearwardly of said axle 78 when the auxiliary wheel 70 is in the operative position of FIG. 5.

The piston rod 80 of a cylinder 82 is pivotally secured to the body attached mount 72 as at 84 and acts, as in the previously described structure, to move the auxiliary wheel 70 from the inoperative stored upper position shown in dotted lines in FIG. 6 to the lower position at which the auxiliary wheel engages the vehicle supporting surface 48 with the plane of said wheel inclined to the vertical (FIG. 6).

With the auxiliary wheel in the full line position of FIG. 6 the vehicle may then be driven in reverse by the front wheel drive so that the auxiliary wheel assumes the position of FIG. 5, in which position the rear wheels 12,13 are raised off the supporting surface 48 (FIG. 5).

In order to reduce the amount that the sprung weight of the vehicle is lifted it is desirable to apply the upwardly directed force to the axle. To this end, a cam-shaped bracket 88 is preferably fixed secured to the mount 72 as seen in FIGS. 5, 6, so that as the auxiliary wheel 70 moves to the vertical position of FIG. 5 the bracket 88 engages under the axle 78 to provide the lifting force. The relative movement between the mount 72 and axle 78 may be smoothed out by providing a roller indicated at 90 and rotably secured to axle 78 by bracket 92. Such a roller insures that the bracket 88 becomes positioned under the axle in the desired manner.

When the vehicle is being driven sidewise, the hanger 76 provides some yieldability between the sprung weight and unsprung weight so that the vehicle springs are not locked out.

As best seen in FIG. 5, the mount 72 is swingably secured to arm 74 by bolt 92 for swinging about a substantially vertical axis. The lower end of arm 74 is provided with a plate 94 having an extension 96 on which are mounted a pair of hydraulic cylinders 98,100 with their pistons connected to extensions 102 on mount 72. Said cylinders may be remotely connected to pedals at the driver's seat to permit the mount to be swung from the full line position of FIG. 4 to the dotted line position and vice versa. This movement of the mount should of course be done when the mount is in the upper stored position.

By thus making the mount moveable between the positions indicated, a somewhat more flexible use of the device is made possible. For example, in the arrangement shown in FIG. 7, with the left front wheel 50 locked and with the auxiliary wheel 70 in the dotted line position of FIG. 4 the right front wheel 51 may be driven to effect the desired sideward movement.

In order to increase the stability of the vehicle when being side driven it may be desirable to employ two auxiliary wheels as shown in FIGS. 8, 9. In this case, the mount 110 is provided with cheek plates 112 on which wheels 114,115 are rotably mounted. As best seen in FIG. 8, said plates are bent so that the axis of each wheel is directed toward the same front wheel. In FIG. 8, 9, a bracket 116, similar to bracket 26 in FIG. 2 is provided cooperating with a hydraulic cylinder connecting rod 118 for swinging the mount 110 in a manner similar to that shown in FIG. 2.

Referring now to FIG. 10, which is a schematic, plan view illustrative of the invention, front wheels 127 are rotatably attached to axle 109 which supports frame 119 in a conventional manner. It will also be recognized that the frame 119 is constructed in a manner well known in the art to allow front wheels 127 to be turned by the vehicle's steering means. The frame 119 of the vehicle would also support engine 117 which transmits power to front driving wheels 127, through transmission means 113 in a known fashion. The rear wheels 126 are rotatably connected to axles 121 which are connected to linkages 120. The linkages 120 are attached to plate 122 which allows the vehicle to be yieldably supported in a conventional manner through the rear wheels 126.

The axis of rotation 125 of the auxiliary wheel 128 when in the ground engaging and rear end of the vehicle lifting position is set at an angle to the longitudinal center line 123 of the vehicle. In this figure the angle formed by axis rotation 125 and longitudinal center line 123 has been set to be approximately 40°, which is the preferred embodiment of the invention. The plane of rotation 125′ of the auxiliary wheel 128 is of course 90° from the axis of rotation 125 and thus the plane of rotation 125′ is at an angle of 50° to the longitudinal center line 123.

It should be recognized that the benefits of this invention may be utilized with an auxiliary wheel (as demonstrated by the phantoms) which have an axis of rotation set at an angle between 20° and 60° to the longitudinal center line, which for the purposes of this invention is defined or limited to be a substantial angle.

It will be recognized that this schematic view in FIG. 10 is applicable to all the mounts shown, herein, and all others known in the art. The operation of engaging the auxiliary wheel 128 and moving it to the ground engaging and rear end of the vehicle lifting position is enhanced by the substantial angle of the auxiliary wheel's axis of rotation 125 to the longitudinal center line 128. It will also be recognized to those skilled in the art that the auxiliary wheel 128 may be made steerable or turnable in a fashion similar to that shown in FIG. 4 or that shown in FIGS. 11, 12, 13 and 14 or other known method.

It should also be recognized from FIG. 10 that inclining the front wheels 127, in a like or similar direction to the auxiliary wheel 128 when in the ground engaging and rear end of the vehicle lifting position, whereby the plane of rotation of the auxiliary wheel and the front wheels are both directed away from the longitudinal center line of the vehicle, in a similar direction, although not necessarily an equivalent angle and then rotating the front wheels 127 will cause the vehicle to be translated in a sidewise direction. Most passenger cars, for instance, having front wheel drive can only incline the plane of rotation of front wheels at an angle of approximate 30° to the longitudinal center line, while in FIG. 10 the auxiliary wheel's plane of rotation 125′ is directed 50° from the longitudinal center line 123.

Thus, when the front wheels 127, are inclined in a direction to the right and the auxiliary wheel 128 is in the ground engaging and rear end of the vehicle lifting position with the plane of rotation 125′ of the auxiliary wheel 128 also inclined to the right, and thus the auxiliary wheel 128 and front wheels 127, are directed in a similar direction, forward power applied to the front wheels 127, to rotate the front wheels will cause the front and rear portions of the vehicle to be urged to the right, though at a different rate dependent upon the difference in the angles of the auxiliary wheel 128 and the front wheels 127, to the center line 123 of the vehicle. By turning the front wheels 127, in a direction opposite to the plane of rotation 125′ of the auxiliary wheel 128, in this case to the left of the vehicle when the auxiliary wheel remains turned to the right side of the vehicle, and the auxiliary wheel 128 is in the ground engaging and rear end of the vehicle lifting position and forward power is applied to the front wheels 127, to rotate the front wheels, the vehicle is urged in a circular direction, part or full circle which is of a much smaller diameter than with standard non-steerable rear wheels, in a manner similar as discussed and shown with respect to FIG. 16.

Referring to FIG. 10, axis of rotation 125 passes between the front wheel 127 and rear wheel 126 on the left side of the vehicle. The angle formed by the axis of rotation 125 and the longitudinal center line 123 is not limited to that shown but must be a substantial angle between 20° and 60°, as demonstrated by the phantoms in FIG. 10. It is also obvious that the auxiliary wheel 128 can be positioned so that the axis of rotation 125 passes between front wheel 127 and rear wheel 126 on the right side of the vehicle. It will be recognized that the angle formed by this repositioned axis of rotation 125 and the longitudinal center line 223 would then be a negative angle relative to the previous angle. The use of the auxiliary wheel would yield similar results in a mirror-like fashion.

Referring to FIGS. 11 through 14, a modified version of the present invention is shown. For clarity the auxiliary wheel in FIGS. 11–14 are not shown at the substantial angle to the longitudinal center line of 20°–60°. The auxiliary wheel 150 is rotably supported by axle 149 connected to wheel mount 143. In this embodiment the wheel mount 143 is connected to and positionable by the bearing mount 142 which may be selectively positioned by hydraulic actuator 141. The hydraulic actuator and the bearing mount are carried by wheel mount frame 133. The wheel mount 133 is connected to arms 140 (see FIG. 14) which is swingably connected to yieldable hangers 130, by member 139, (see FIG. 14). This allows the auxiliary wheel 150 to be moved between the upper out-of-the-way position shown in FIG. 11 to the ground engaging position shown in FIG. 12 and then to the ground engaging and fully lifting position shown in FIG. 13.

In FIGS. 11–14 hangers 130, (see FIG. 14) are flexible, cantilever members, which provides some additional yieldable support when the auxiliary wheel 150 is in ground engaging and rear end of the vehicle lifting position (FIG. 13). The hangers 130, also provide yieldable support to the auxiliary wheel 150 and wheel mount 143 when the auxiliary wheel 150 is in the upper out-of-the-way position. (FIG. 11).

The auxiliary wheel 150 is actuated to its operative position by the wheel mount frame 133 to which is pivotally connected a clevis 134 on the outer end of piston rod 135 of a hydraulic cylinder 136. The opposite end of the hydraulic cylinder 136 is pivotally connected by pin 137 to bracket 138 which may be fixed to the body or other convenient point, as in this case the floor of the vehicle 170. The actuation of the hydraulic cylinder 136, thereby causes the movement of the auxiliary wheel to its various positions.

Plates 147 attached to wheel mount frame 133 engage the axle 144 and lifting the vehicle through the yieldable means for supporting the rear portion of the vehicle. This relative movement between the wheel mount frame 133 and axle 144 may be enhanced by the provision of roller 146 rotably secured to axle 144 by bracket 145. When the auxiliary wheel 150 in the ground engaging and rear end of the vehicle lifting position, as shown in FIG. 14, it becomes clear that the auxiliary wheel 150 is steerable through the power means of the hydraulic actuator 141. For simplicity and clarity, the hydraulic hoses have not been shown. Furthermore it should also be obvious that this same function could be performed by a dual action hydraulic cylinder or the two cylinder means shown in FIG. 4. It should be appreciated that these changes of angularity of the auxiliary wheel 150 be done when the auxiliary wheel is in a non-ground engaging position of the auxiliary wheel.

Axle 144 is supported and engaged at two points substantially near the center line of the vehicle and between the rear wheels by a pair of plates 147, fixed to wheel mount frame 133 to provide additional stability when the auxiliary wheel 150 is in the operative ground engaging and rear end of the vehicle lifting position. This configuration allows ease of engagement of the axle 144 as the center of the axle 144 is always maintained at approximately the same distance from the frame even when a flat tire or other moderately warped terrain is encountered. Thus, the auxiliary wheel, when in the ground engaging and rear end of the vehicle lifting position and the parking brake and/or other front wheel locking means is used, this device may be used to aid the changing of the flat rear tire without use of other jacking means.

The vehicle is shown with a rear suspension system represented by leaf springs 151 in FIG. 11. The leaf springs 151 provide yieldable support to the rear portion of the vehicle. The leaf springs 151 are connected to the axle 144 by U-shaped clamp 153 with threaded ends, bracket 156 and nuts 157, or other known manner. The springs 151 are fixed to the frame of the vehicle by shackle 155 attached to bracket 154 and another point (not shown) forward of the rear axle. It will be recognized that this is only a representative form of suspension system, and that this invention has broad applications to all forms of suspension systems including mechanical and gas yieldable means. It will also be apparent that the details of the leaf springs and 151 have been omitted from the other FIGS. 12, 13, 14 for simplicity and clarity.

It should be appreciated that the axle 144 shown in FIGS. 11, 12, 13 and 14 may be substituted for an elongated member which has no other function than a member for the plates 147, to engage and to support the rear portion of the vehicle through the vehicle's yieldable means, when the auxiliary wheel is in the ground engaging and rear end of the vehicle lifting position.

Referring now to FIG. 10, a longitudinal member 124 is shown extending between the rear wheels 126. It would be connected to axles 121, so that it is part of the unsprung weight of the vehicle. It will be recognized that the elongated member 124 should be attached in a jointed fashion to at least one of the rear axles 121, so as to not interfere with the relative independence of the rear portion of the vehicle's suspension system as shown in FIG. 10.

Operation and use of this vehicle mounted parking device in conjunction with a four wheel vehicle 171 is apparent from FIG. 15. The vehicle 171 is shown in three positions A, B, C. The vehicle 171 in Position A is urged to position B by the motive means of the vehicle through the rotation of the front wheels 160,161. The front wheels 160,161 while being powered are inclined toward curb 190. The vehicle 171 is then halted and auxiliary wheel 167 is actuated from the out-of-the-way position to the ground engaging and rear end of the vehicle lifting position, whereby the rear wheels 162,163 no longer contact the ground. The auxiliary wheel 167 when it engages the ground and then moves to the ground engaging and rear end of the vehicle lifting position is disposed with axis of rotation 165 at a substantial angle, to longitudinal center axis 166 of the vehicle. The front wheels 160,161 of the vehicle 171 in position B, once the auxiliary wheel 167 is engaged and the rear wheels 162,163 are no longer contacting the surface, are driven by the vehicle motive means and directed toward the curb 190 which is a direction in that both are directed to the right side of the vehicle. This driving of the front wheel 160,161 in a forward rotational manner causes the vehicle to be translated in a sidewards manner on the auxiliary wheel 167 and front wheels 161, 160 to curb 190 and into Position "C".

Once the vehicle 171 is in Position "C", the auxiliary wheel 167 is disengaged and the vehicle 171 is parked with front wheels 160,161 and rear wheels 162,163 contacting the ground. From FIG. 15, it will now be obvious that the vehicle 171 may be extracted from Position C between vehicles 180 and 181 in several fashions. It is obvious that one could and translate the wheels 160,161,162,163 rearwardly, and then direct the front wheels away from curb 190, in this case to the left side of the vehicle, and power the vehicle out of the parking space by forward rotation of the front driving wheels so that the vehicle is extricated from between vehicles 180 and vehicle 181 in one forward motion.

It is well known that the size of parking spaces vary, both by the constraints of vehicles, such as depicted by vehicles 180 and 181 in FIG. 15 or by the space allotted by the spacing of parking meters or parking lines. It may, therefore, be necessary to maneuver a vehicle with the invention herein described from relatively small spaces. Referring to FIG. 15, the vehicle 171 in position C may be withdrawn from its position, by reversing the procedure set out above for parking the vehicle 171.

It should be recognized that, as shown in FIG. 15, the angle that the axis of rotation 165 of the auxiliary wheel 167 is inclined from the longitudinal center line 166 and the angle that the vehicle 171 itself is inclined to the curb 190 controls the path of travel which the rear portion of the vehicle 171 moves to curb 190. Thus, the greater the angle formed by the axis of rotation 165 and longitudinal center line 166 and the vehicle 171 to the curb 190 the more directly the rear portion of the vehicle 171 moves to the curb 190 for a unit of forward travel along the curb 190 by the vehicle 171.

Thus in FIG. 15 the movement of the vehicle 171 is effectuated from Position B to Position C. In particular it should be noted that in FIG. 15, the auxiliary wheel's axis of rotation 165 is about 40° to the longitudinal center line 166. The vehicle 171 in position B is approximately 30° to the curb 190. When the front wheels 160, 161 are inclined to their maximum angle whereby their plane of rotation is about 30° to the longitudinal center line and the front wheels 160, 161 in this inclined position do then rotate causing the vehicle to be translated sidewise. The rear portion of the vehicle comes to the curb 190 approximately twice as rapidly as the front portion for a given unit of forward travel. Thus the vehicle when stopped in position C is approximately parallel and in close proximity to the curb 190. This process in the preferred embodiment of the invention allows the rear portion of the vehicle to travel approximately 7 to 8 feet to the curb 190 while the vehicle only travels approximately 4 feet of forward travel, as shown in the vehicle 171 going from Position B to Position C.

It should also be recognized that parking on the left side of a one way street would be accomplished in the similar manner, as shown and described with respect to FIG. 15, if the auxiliary wheel has power means for changing the orientation of the axis of rotation, as shown in FIGS. 4 and 14, particularly. The vehicle would be driven forward into the space such that the front portion of the vehicle would be in closer proximity to the curb than the rear end of the vehicle. The auxiliary wheel would then be positioned and actuated to the ground engaging and rear end of the vehicle lifting position whereby its plane of rotation would be directed toward the curb and between the wheels on the left side of the vehicle. The front wheels would then be inclined toward the curb and the rotation of the front driving wheels causing the vehicle to be driven sidewise into the curb.

However, parking the vehicle, of the type shown in FIG. 15 on a left side of the street, without use of power means to selectively position the auxiliary wheel's orientation, would be easily accomplished in a slightly modified manner. The vehicle would be driven into the parking space in a mirror image fashion to FIG. 15, except that the extreme front of the vehicle would be in close proximity to the front most portion of the available space. The front wheels are turned hard right and thus the front portion of the wheels would be directed away from the curb in a similar direction to the auxiliary wheel 167, as shown in FIG. 15. The auxiliary wheel would be actuated to the ground engaging and rear end of the vehicle lifting position. The front wheels would then be driven rearwardly toward the curb causing the vehicle to be driven sidewise to the curb to a position similar to Position C in FIG. 15 on the left side of the one way street.

Referring generally to FIG. 15, the action of the hydraulic cylinder used to engage the auxiliary wheel 167 causes the auxiliary wheel 167 to be rotated on its axis or rotation 163 as it engages the ground and then moves to the ground engaging and rear end of the vehicle lifting position. This overcomes many problems, as the front portion of the vehicle is not significantly translated.

By way of example, in a vehicle equipped with a transmission with a park position or other similar transmission mode or position, the engagement of the auxiliary wheel is accomplished in the park position, whereby as the wheel is engaged one front wheel is translated slightly forward while the other wheel is translated slightly rearward. The net effect of this is no substantial forward or rearward movement of the vehicle beyond a slight change in the orientation of the front of the vehicle and a slight movement of the rear of the vehicle in the direction of the plane of rotation of the auxiliary wheel. The benefits are obvious that the vehicle needs no special braking system on either front wheel and that the vehicle is in a controlled position when the auxiliary wheel is in the out-of-the-way position, the ground engaging position, and the ground engaging and rear end of the vehicle lifting position. Thus, even when on a hill or crowned surface tending to urge the auxiliary wheel to freely rotate, the front wheel braking means is sufficient to control movement.

Thus, returning to FIG. 15, in the preferred embodiment the vehicle 171 would be driven from position "A" to position "B" in a normal fashion, whereby the front curb side portion of the vehicle 171 in Position "B" would be approximately four feet from the curb and the rear curb side portion of the vehicle would be 7 to 8 feet from the curb. The vehicle 171 would be then placed in park or other similar transmission mode, whereby only slight relative movement of the front wheels is permitted. By way of example, the auxiliary wheel 167, as shown in FIG. 15, would then be actuated to the ground engaging position and then the auxiliary wheel 167 powered by the hydraulic means (FIG. 12) would roll into the ground engaging and rear end of the vehicle lifting position (FIG. 13). Upon movement from the ground engaging to the ground engaging and rear end of the vehicle lifting position, one of the front wheels would be translated slightly forward while the other front wheel would be translated slightly rearward. The net movement of the front wheel would then of course be zero.

Once the auxiliary wheel 167 is in the ground engaging and vehicle lifting position, the vehicle's transmission is then placed in its normal forward translation mode and the front wheels are directed toward the curb. It should be recognized that the auxiliary wheel 167 is also directed toward the curb. It is also apparent from the FIG. 15 that the planes of rotation of the auxiliary wheel and the front wheels to the longitudinal center line of the vehicle are not equivalent, however since they are directed away from the longitudinal center line 166 toward the same side of the vehicle, for the purposes of this invention this is defined as a similar direction. In this case the plane of rotation 165 of auxiliary wheel 167 is directed 50° from the longitudinal center line 166 while the front wheels 160, 161 have plans of rotation directed approximately 30° from the longitudinal center line 166.

The variance in the amount of these angles and the angle of the vehicle 171 to the curb 190, as depicted in Position B, allows the rear portion of the vehicle to travel to the curb 190 as the front portion of the car comes to the curb 190, as shown by the vehicle in Position C. The auxiliary wheel 167 would then be retracted to the out-of-the-way position. The vehicle 171 may be removed from position C in any of the manners previously set forth, although it is preferably accomplished by backing the vehicle in a normal fashion into close proximity with vehicle 180 and then directing the front wheels 160, 161 sharply away from the curb 190 and then driving out of the space in a normal fashion, such that the vehicle is extracted from the space in one forward movement.

Referring now to FIG. 16, another feature of the present invention is depicted. Vehicle 182 is shown in position A, as a vehicle at rest with all four wheels 172, 173, 174, 175 in contact with the ground. The auxiliary wheel 186 is actuated to the ground engaging and rear end of the vehicle lifting position of vehicle 182 whereby the rear wheels 172,173 no longer contact the ground.

The auxiliary wheel is in the ground engaging and rear end of the vehicle lifting position, the front driving wheels 174, 175 of the vehicle are turned hard left which is a direction opposite to the auxiliary wheel 186 which has its plane of rotation directed 50° from the vehicle's longitudinal center line. By applying power to the front wheels 174, 175, while in this inclined attitude, the vehicle is translated in a manner causing it to be turned in a space substantially smaller than possible with a standard front wheel drive vehicle having only front steering and non-steerable rear wheels.

The vehicle 182 in Position A is rotated and translated to the desired direction, or as shown in this case to Position B by the traction of the front driving wheels in conjunction with the orientation of the front wheels and the auxiliary wheel. It is obvious that the vehicle 182 in Position A can be rotated and translated to any desired position located along the vehicle's path from Position A to Position B. Moreover, if desired, the vehicle 182 can be continued on its path in the circular like manner beyond the position defined by Position B. Once the vehicle 182 is in the desired position, the auxiliary wheel 186 can be then moved to the out-of-the-way position where the rear wheels 172, 173 are again in contact with the ground and the vehicle 182 can then proceed by being drive in a normal fashion.

The auxiliary wheel as used in this invention is not limited to a particular size or type of wheel. It should be recognized that the only requirements of the auxiliary wheel is that it is adapted to be carried by the vehicle in the manner disclosed or other known manner and that it is capable of supporting the weight of the rear portion of the vehicle, at a limited speed of rotation. Thus, the auxiliary wheel may be a solid rubber tire or a pneumatic tire with sufficient internal pressure to support the weight of the rear end of the vehicle without excessive deflection.

From the foregoing it can be seen that a vehicle mounted parking device, for use on a front wheel drive vehicle having at least two front and two rear wheels comprising an auxiliary wheel mounted substantially between and equidistant from the rear wheels of the vehicle, has been described. The auxiliary wheel when in its operative position allows the rear end of the vehicle to be supported at least in part through the yieldable means which normally support the rear end of the vehicle and allows the rear end of the vehicle to be driven in a sideward fashion by the actuation of the front driving wheels in a forward or reverse fashion. While several embodiments of the invention have been described and illustrated, it will be apparent to those skilled in the art that various changes, omissions, additions, and substitutions may be made in the construction of the apparatus and that the apparatus may be put to uses other than those described without departing from the spirit of the invention as described in the appended claims.

It is claimed that:

1. A vehicle mounted parking device for use on a front wheel drive motor vehicle having motive means, frame means, yieldable means for yieldable supporting the rear end of the vehicle attached to said frame means, rear axle means carried by the yieldable means for yieldably supporting the rear end of the vehicle, at least two rear wheels rotatably attached to said rear axle means, at least two front wheels, steering means for selectively directing the front wheels of the vehicle, and motive means for selectively applying power to certain of the wheels, the device comprising a wheel mount, an auxiliary wheel rotatably supported on said wheel mount, mounting means adapted to be carried by the rear portion of the vehicle for supporting the wheel mount for movement of the auxiliary wheel between an operative ground engaging and rear end of the vehicle lifting position and out-of-the-way position, power means connected to the wheel mount to cause the wheel mount to be moved from the out-of-the-way position to the ground engaging and rear end of the vehicle lifting position, whereby the rear wheels of the vehicle are lifted off the ground and the mounting means for said wheel mount engages the rear axle means and provides support to the rear portion of the vehicle through the yieldable means for supporting the rear portion of the vehicle, and said auxiliary wheel when in said ground engaging and rear end of the vehicle lifting position is disposed substantially between and equidistant from each of the rear wheels and is disposed with its axis of rotation inclined at a substantial angle from the longitudinal center line of the vehicle so that the axis of rotation of the auxiliary wheel passes between the front and rear wheels on one of two sides of the vehicle, said vehicle moving generally in a sidewise direction when the auxiliary wheel is in said ground engaging and vehicle lifting position and when said front wheels are directed by said steering means in a direction similar to the auxiliary wheel and power is applied to the front wheels from the motive means to cause rotation of the front wheels.

2. A device according to claim 1 further comprising an elongated member substantially between the rear wheels of the vehicle and connected to the rear axis means such that the mounting means actually engages the elongated member to lift and support the rear portion of the vehicle when said auxiliary wheel is moved to the ground engaging and rear end of the vehicle lifting position.

3. A device according to claim 1 further comprising an elongated member substantially between the rear wheels of the vehicle and connected to the rear axle means wherein the mounting means is carried by the elongated member such that the auxiliary wheel rotates about the elongated member from the out-of-the-way position to the ground engaging and rear end of the vehicle lifting position.

4. A device according to claim 3 further comprising bearings which pivotally secure the mounting means to the elongated round member.

5. A device according to claim 3 wherein the substantial angle that the axis of rotation of the auxiliary wheel is inclined from the longitudinal center line of the vehicle is substantially between 25° and 65°.

6. A device according to claim 3 wherein the substantial angle that the axis of rotation of the auxiliary wheel is inclined from the longitudinal center line of the vehicle is approximately 35° to 50°.

7. A device according to claim 1 further comprising power means for selectively positioning the auxiliary wheel so that the axis of rotation of the auxiliary wheel may be positioned at a variety of angles to change the rate of lateral movement of the rear portion of the vehicle per transverse movement of the vehicle.

8. A device according to claim 7 wherein the auxiliary wheel may be selectively positioned by said power means for selectively positioning the auxiliary wheel such that the axis of rotation of the auxiliary wheel may be directed to pass between the front and rear wheels on one side of the vehicle and then redirected to pass between the front and rear wheels on the other side of the vehicle.

9. A device according to claim 7 wherein the auxiliary wheel may be selectively positioned by said power means for selectively positioning the auxiliary wheel so that that the axis of rotation of said auxiliary wheel is positionable at an angle of at least 50° on each side of the longitudinal center line of the vehicle.

10. A device according to claim 2 further comprising yieldable means connected to the frame means for supporting said mounting means whereby yieldable support is provided to said auxiliary wheel, the wheel mount and the mounting means when the auxiliary wheel is in the out-of-the-way position and whereby yieldable support is provided to the rear portion of the vehicle by the yieldable means for supporting the rear portion of the vehicle and by the yieldable means for supporting said mounting means when the auxiliary wheel is in the ground engaging and rear end of the vehicle lifting position.

11. A device according to claim 10 wherein upon movement from the out-of-the-way position to the ground engaging position the auxiliary wheel engages the ground with its axis of rotation at a substantial angle to the longitudinal center line of the vehicle, and whereby, upon the continued urging of the power means the auxiliary wheel is brought to the operative ground engaging and rear end of hte vehicle lifting position by a slight forward movement of one front wheel and a slight rearward movement of the other front wheel.

12. A device according to claim 2 further comprising hanger means for yieldably supporting said mounting means on said frame, wherein said hanger is positioned centrally along the frame means of the vehicle and above the elongated member.

13. A device according to claim 12 wherein said hanger means provides yieldable support to the rear portion of the vehicle in conjunction with the yieldable means for supporting the rear portion of the vehicle when the auxiliary wheel is in the ground engaging and vehicle lifting position.

14. A device according to claim 1 wherein the power means connected to the wheel mount is a hydraulic cylinder provided with a stop such that the wheel mount's movement is stopped when the auxiliary wheel is in a substantially vertical orientation in the ground engaging and rear end of the vehicle lifting position.

15. A device according to claim 1 wherein the auxiliary wheel is a pneumatic tire with sufficient internal pressure to support the weight of the rear portion of the vehicle when the auxiliary wheel is in the ground engaging and rear end of the vehicle lifting position.

16. A device according to claim 1 wherein the auxiliary wheel is at a substantial angle to the longitudinal center line of the vehicle as the auxiliary wheel engages the ground so that the rotation of the auxiliary wheel aids the power means in moving the auxiliary wheel to the ground engaging and rear end of the vehicle lifting position.

17. A device according to claim 16 wherein the motive means of the vehicle has a transmission means which is set in the park position as the auxiliary wheel is moved from the out-of-the-way position to the ground engaging and rear end of the vehicle lifting position.

18. A device according to claim 17 wherein the net movement of the front wheels of the vehicle is insubstantial when the auxiliary moved from the out-of-the-way position to the ground engaging and rear of the vehicle lifting position.

19. A device according to claim 1 further comprising an elongated member substantially between the rear wheels of the vehicle and connected to the rear axle means such that the mounting means actually engages the elongated member to lift and support the rear portion of the vehicle when the auxiliary wheel is moved to the ground engaging and rear end of the vehicle lifting position wherein the axis of rotation of the auxiliary wheel when in said ground engaging and rear end of the vehicle lifting position is directed between the front and rear wheels on the left side of the vehicle and the substantial angle that the axis of rotation is inclined from the longitudinal center of the line of the vehicle is approximately 35° to 50°.

20. A device according to claim 1 further comprising an elongated member substantially between the rear wheels of the vehicle and connected to the rear axle means wherein the mounting means is carried by the elongated member such that the auxiliary wheel rotates about the elongated member from the out-of-the-way position to the ground engaging and rear end of the vehicle lifting position and the axis of rotation of the auxiliary wheel when in said ground engaging and rear end of the vehicle lifting position is directed between the front and rear wheels on the left side of the vehicle and the substantial angle that the axis of rotation is inclined from the longitudinal center line of the vehicle approximately 35° to 50°.

* * * * *